United States Patent
Ko et al.

(10) Patent No.: US 7,759,954 B2
(45) Date of Patent: Jul. 20, 2010

(54) SEMICONDUCTOR PROBE HAVING RESISTIVE TIP AND METHOD OF FABRICATING THE SAME

(75) Inventors: Hyoung-soo Ko, Seoul (KR); Ju-hwan Jung, Seoul (KR); Seung-bum Hong, Seongnam-si (KR); Chul-min Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 218 days.

(21) Appl. No.: 11/861,417

(22) Filed: Sep. 26, 2007

(65) Prior Publication Data

US 2008/0116926 A1 May 22, 2008

(30) Foreign Application Priority Data

Nov. 16, 2006 (KR) ...................... 10-2006-0113388

(51) Int. Cl.
*G01R 31/02* (2006.01)
(52) U.S. Cl. ..................................................... 324/757
(58) Field of Classification Search .............. 324/158.1, 324/754–762; 29/874; 257/48
See application file for complete search history.

(56) References Cited

U.S. PATENT DOCUMENTS

| | | | | |
|---|---|---|---|---|
| 5,923,033 A * | 7/1999 | Takayama et al. | ........... | 250/234 |
| 6,028,436 A * | 2/2000 | Akram et al. | ............... | 324/755 |
| 6,255,213 B1 * | 7/2001 | Akram | ........................ | 438/652 |
| 6,469,532 B2 * | 10/2002 | Akram et al. | ............... | 324/755 |
| 6,684,499 B2 * | 2/2004 | Romano et al. | ............... | 29/874 |
| 6,913,982 B2 * | 7/2005 | Lim et al. | .................... | 438/378 |
| 7,008,811 B2 * | 3/2006 | Park et al. | ..................... | 438/48 |
| 7,302,202 B2 * | 11/2007 | Tai et al. | ....................... | 399/92 |
| 7,367,119 B2 * | 5/2008 | Belov | .......................... | 29/846 |
| 7,411,210 B2 * | 8/2008 | Jung et al. | .................... | 257/48 |
| 7,671,616 B2 * | 3/2010 | Jung et al. | .................. | 324/762 |

FOREIGN PATENT DOCUMENTS

CN 1811944 A 8/2006

* cited by examiner

*Primary Examiner*—Ha Tran T Nguyen
*Assistant Examiner*—Joshua Benitez
(74) *Attorney, Agent, or Firm*—Sughrue Mion, PLLC

(57) ABSTRACT

Provided are a semiconductor probe having a resistive tip and a method of fabricating the semiconductor probe. The semiconductor probe includes a resistive tip which is doped with a first impurity, and of which an apex portion is doped with a low concentration of a second impurity of opposite polarity to the first impurity, wherein first and second semiconductor electrode regions doped with a high concentration of the second impurity is formed on slopes of the resistive tip; a dielectric layer formed on the resistive tip; an electric field shield which is formed on the dielectric layer, and forms a plane together with the dielectric layer on the apex portion of the resistive tip; and a cantilever having an end on which the resistive tip is located.

7 Claims, 9 Drawing Sheets

SEMICONDUCTOR PROBE HAVING RESISTIVE TIP AND METHOD OF FABRICATING THE SAME

CROSS-REFERENCE TO RELATED PATENT APPLICATIONS

This application claims priority from Korean Patent Application No. 10-2006-0113388, filed on Nov. 16, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a semiconductor probe having a resistive tip and a method of fabricating the same, and more particularly, to semiconductor probe in which a dielectric layer that protects a resistive tip and an electric field shield for increasing resolution form a plane on an apex of the resistive tip, and a method of fabricating the same.

2. Description of the Related Art

With the increase in demand for small electronic devices such as mobile communication terminals and personal digital assistants comes the need for ultra small highly integrated recording media. However, since further miniaturization of a related art hard disk is not easy, and higher integration of a flash memory is also difficult, scanning probe storage is being investigated as an alternative method of information storage.

A scanning probe is used for various scanning probe microscopy (SPM) techniques. Examples of these are a scanning tunneling microscope (STM) that generates information by detecting a current that flows according to a voltage difference applied between a scanning probe and a specimen, an atomic force microscope (AFM) that uses an atomic force between a scanning probe and a specimen, a magnetic force microscope (MFM) that uses a magnetic force between a magnetic field of a specimen and a magnetized scanning probe, a scanning near-field optical microscope (SNOM) that overcomes the resolution limit of visible light, and an electrostatic force microscope (EFM) that uses an electrostatic charge between a specimen and a scanning probe.

In order to read and write information at high speed and high density using SPM techniques, the scanning probe must be able to detect the surface charge of a region as small as a few tens of nanometers in diameter. Also, in order to increase the read and write speed, cantilevers must be fabricated in an array.

FIG. 1 is a cross-sectional view of a cantilever 70 having a resistive tip 50 disclosed in International Patent Publication No. WO 03/096409. The resistive tip 50 is formed vertically on the cantilever 70 that may be fabricated in an array, and may have a resistance region 56 with a diameter of a few tens of nanometers.

Referring to FIG. 1, the resistive tip 50 of a semiconductor probe includes a main body 58 doped with a first impurity, the resistance region 56, located on an apex portion of the resistive tip 50 and doped with a low concentration of a second impurity, and first and second semiconductor electrode regions 52 and 54 which are located on both side slopes of the main body 58 and are doped with a high concentration of the second impurity.

However, in the semiconductor probe having the resistive tip 50, the regions of the slopes of the first and second semiconductor electrode regions 52 and 54 doped with a high concentration may be reduced by excessive etching during a wet etching process for forming the resistive tip 50. Accordingly, the conductive regions on the slopes are reduced, which increases the size and the resistance of the resistance region 56, thereby reducing the spatial resolution with respect to a resistance variation. Also, there is a problem of wear at the end of the resistive tip.

In order to increase the spatial resolution, researches have been conducted for a semiconductor probe having an electric field shield on the slope of a resistive tip. However, although the spatial resolution of this type of semiconductor probe can be increased, its performance is reduced due to friction of the resistive tip.

SUMMARY OF THE INVENTION

The present invention provides a semiconductor probe that has a high spatial resolution and can protect an apex of a resistive tip.

The present invention also provides a method of fabricating the semiconductor probe.

According to an aspect of the present invention, there is provided a semiconductor probe having a resistive tip, comprising: a resistive tip which is doped with a first impurity, in which an apex of a resistance region is doped with a low concentration of a second impurity of opposite polarity to the first impurity, and first and second semiconductor electrode regions doped with a high concentration of the second impurity being formed on slopes thereof, a dielectric layer formed on the resistive tip; an electric field shield that is formed on the dielectric layer and form a plane together with the dielectric layer on the apex of the resistive tip; and a cantilever having an end on which the resistive tip is located.

The plane may have a diameter of 5 nm to 500 nm.

The dielectric layer formed on the apex of the resistive tip may have a thickness of 1 nm to 100 nm.

The semiconductor probe may further comprise an insulating layer that surrounds the dielectric layer to extend the plane.

The dielectric layer formed on the apex of the resistive tip may have a thickness of 1 nm to 100 nm.

The first impurity may be a p type impurity and the second impurity is an n type impurity.

According to another aspect of the present invention, there is provided a method of fabricating a semiconductor probe having a resistive tip, comprising: (a) forming a first mask having a first portion having a stripe shape in a first direction and first windows on both sides of the first portion on an upper surface of a substrate doped with a first impurity; (b) doping a first region of the substrate exposed by the first windows with a second impurity having a polarity opposite to the first impurity; (c) forming a resistance region on a lower part of the first portion by annealing the substrate; (d) patterning the first mask using a photoresist including a second portion having a stripe shape in a second direction perpendicular to the first direction and second windows on both sides of the second portion to form a second mask having a rectangular third portion on a region where the first portion and the second portion cross by and a third window that surrounds the third portion; (e) forming a well and a resistive tip protruding from the well by etching the substrate exposed through the second mask; (f) sequentially forming a dielectric layer and a conductive layer on the substrate; (g) forming an insulating layer covering the well on the conductive layer; (h) polishing the insulating layer using chemical mechanical polishing (CMP) until the conductive layer is exposed; (i) polishing the conductive layer using CMP until the dielectric layer is exposed;

and (j) forming a cantilever having an end on which the resistive tip is located by patterning the substrate.

The first portion and the second portion may have a width of 50 nm to 2 µm.

The forming of the dielectric layer may comprise forming the dielectric layer to a thickness of 1 nm to 100 nm.

The forming of the conductive layer may comprise forming the conductive layer to a thickness of 1 nm to 100 nm.

The forming of the well and the resistive tip further may comprise: removing the third portion and forming an oxide film having a predetermined thickness on a surface of the substrate by annealing the substrate under an oxygen atmosphere; and tapering an end portion of the resistance region by removing the oxide film.

The forming of the oxide film may comprise contacting the resistance regions to each other on a lower part of the third portion.

The polishing of the conductive layer may further comprise removing the insulating layer by etching the insulating layer.

The polishing of the conductive layer may further comprise forming a plane of the dielectric layer together with the conductive layer on the apex of the resistive tip.

The plane may have a diameter of 5 nm to 500 nm.

The forming of the cantilever may comprise forming a plane of the dielectric layer, the conductive layer, and the insulating layer on the resistive tip.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Figure 1:
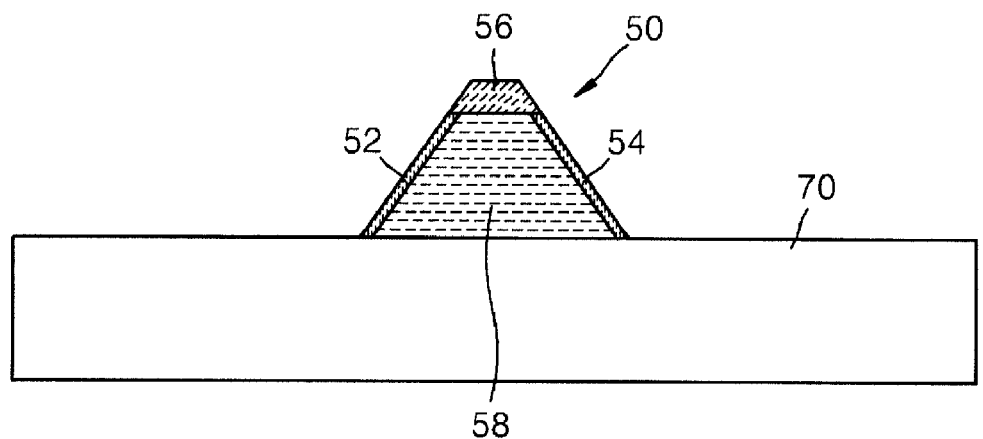
FIG. 1 is a cross-sectional view of a portion of a cantilever having a related art resistive tip.

The present invention will now be described more fully with reference to the accompanying drawings, in which exemplary embodiments of the invention are shown. In the drawings, the thicknesses of layers and regions are exaggerated for clarity.

Figure 2:
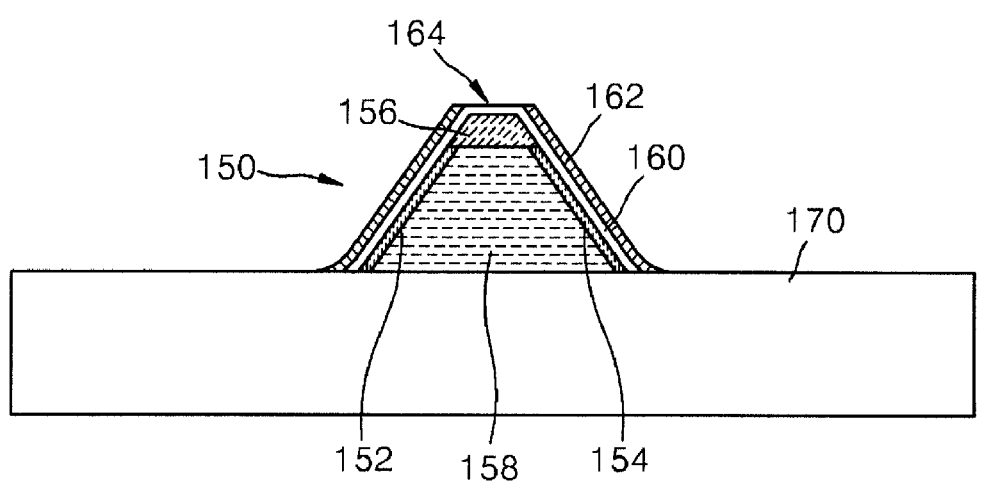
FIG. 2 is a cross-sectional view of a portion of a semiconductor probe having a resistive tip according to an exemplary embodiment of the present invention.

FIG. 2 is a cross-sectional view of a portion of a semiconductor probe having a resistive tip 150 according to an exemplary embodiment of the present invention.

Referring to FIG. 2, the resistive tip 150 of a semiconductor probe is formed vertically on an end of a cantilever 170. The resistive tip 150 includes a main body 158 doped with a first impurity, a resistance region 156 formed on an apex portion of the resistive tip 150 and doped with a low concentration of a second impurity, and first and second semiconductor electrode regions 152 and 154 located respectively on both side slopes of the main body 158 and doped with a high concentration of a second impurity. Here, the first impurity may be a p-type impurity and the second impurity may be an n-type impurity.

A dielectric layer 160 is formed on the resistive tip 150, and an electric field shield 162 is formed on the dielectric layer 160 at both slopes of the resistive tip 150. The dielectric layer 160 can be formed of $SiO_2$ or $Si_3N_4$, and the electric field shield 162 can be formed of, for example, Al or poly silicon.

The dielectric layer 160 can be formed to a thickness of 1 to 100 nm at the apex of the resistive tip 150. The electric field shield 162 forms a plane 164 together with the dielectric layer 160 at the apex of the resistive tip 150. The plane may have a diameter of, for example, 5 to 500 nm.

The dielectric layer 160 prevents the resistive tip 150 from wearing, and the plane 164 prevents the semiconductor probe according to an exemplary embodiment of the present invention from wearing when the semiconductor probe contacts an object to be detected, since the plane 164 gives the resistive tip 150 a wider contact area.

The electric field shield 162 prevents a surface charge of a recording medium 153 (refer to FIG. 3) from affecting regions outside the resistance region 156, that is, the first and second semiconductor electrode regions 152 and 154. The electric field generated by the surface charge causes a resistance difference of the resistance region 156. Therefore, from the resistance difference, the polarity and amount of the surface charge can be precisely measured.

Figure 3:
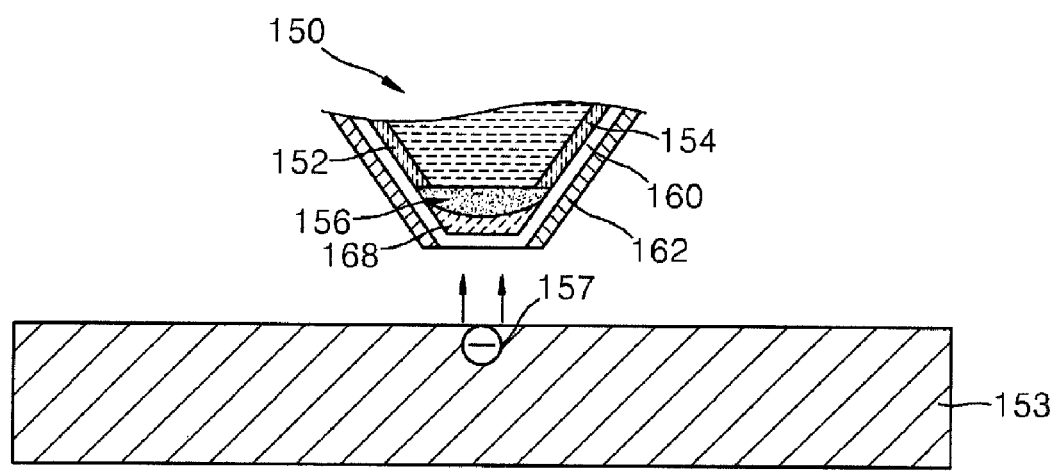
FIG. 3 is a cross-sectional view illustrating the operation of the semiconductor probe having a resistive tip of FIG. 2, according to an exemplary embodiment of the present invention.

FIG. 3 is an enlarged cross-sectional view of the semiconductor probe having a resistive tip of FIG. 2, according to an exemplary embodiment of the present invention.

The operation of the semiconductor probe having a resistive tip 150 according to an exemplary embodiment of the present invention will now be described with reference to FIG. 3.

When the resistive tip 150 according to an exemplary embodiment of the present invention detects a surface charges 157 of a recording medium 153, the resistance of the resistance region 156 changes since the area of the resistance region 156 is reduced by a depletion region 168, even though the depletion region 168 does not expand to the first and second semiconductor electrode regions 152 and 154. Accordingly, the change in the resistance allows the polarity and amount of the surface charge 157 of the recording medium 153 to be detected. The depletion region 168 formed in the resistance region 156 diffuses towards the first and second semiconductor electrode regions 152 and 154 by the electric field which is generated by the surface negative charges 157. In particular, the spatial resolution of the probe having the resistive tip 150 according to the exemplary embodiment of the present embodiment is increased since the entire region of the resistive tip 150 except the resistance region 156 is covered by the electric field shield 162.

Figure 4:
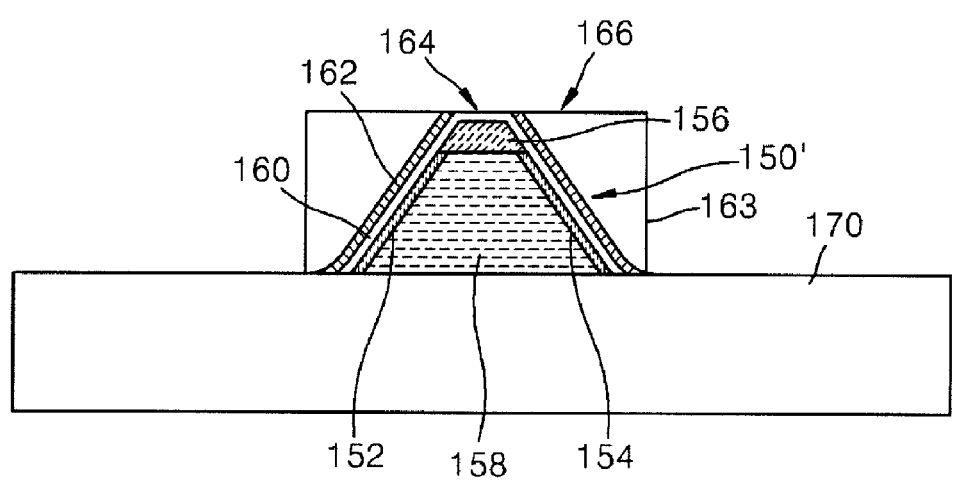
FIG. 4 is a cross-sectional view of a portion of a semiconductor probe having a resistive tip according to another exemplary embodiment of the present invention.

FIG. 4 is a cross-sectional view of a portion of a semiconductor probe having a resistive tip according to another exemplary embodiment of the present invention. Like reference numerals are used to indicate elements that are substantially identical to the elements of FIGS. 2 and 3, and thus the detailed description thereof will be omitted.

Referring to FIG. 4, a resistive tip 150' of a semiconductor probe is formed vertically on an end of a cantilever 170. A dielectric layer 160 is formed on the resistive tip 150', and an electric field shield 162 is formed on the dielectric layer 160 at the slopes of the resistive tip 150'. An insulating layer 163 is further formed around the electric field shield 162. The upper surface of the insulating layer 163 forms a plane 166 together with the upper surfaces of the electric field shield 162 and the dielectric layer 160. The plane 166 prevents the resistive tip 150' from wearing since the plane 166 has a wide contact area with an object to be detected.

The function of the resistive tip 150' of FIG. 4 is substantially the same as that of the resistive tip 150 of FIG. 2, and thus, the detailed description thereof will not be repeated.

FIGS. 5A through 5K are perspective views and cross-sectional views illustrating a method of fabricating a semiconductor probe having a resistive tip according to an exemplary embodiment of the present invention.

Figure 5A:
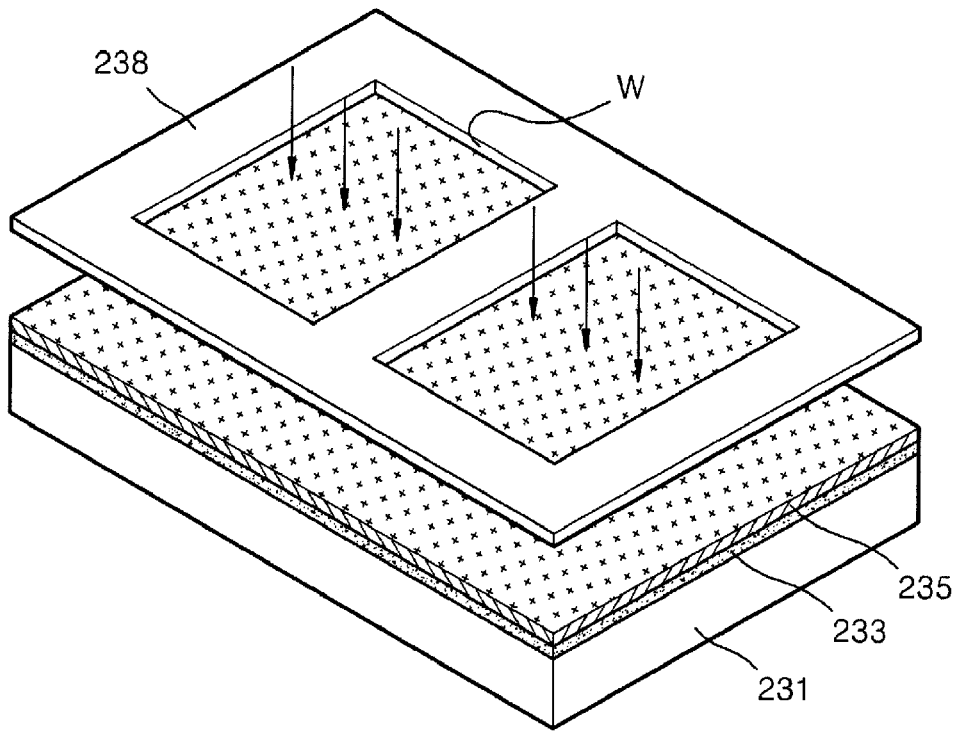
FIGS. 5A through 5K are perspective views and cross-sectional views illustrating an exemplary method of fabricating a semiconductor probe having a resistive tip according to an exemplary embodiment of the present invention.

Referring to FIG. 5A, a mask film 233 of silicon oxide or silicon nitride is formed on the surface of a substrate 231 of a silicon or a silicon on insulator (SOI), which is doped with a first impurity. After coating a photoresist 235 on the mask film 233, a mask 238 in which two windows W are formed is disposed above the substrate 231.

Figure 5B:
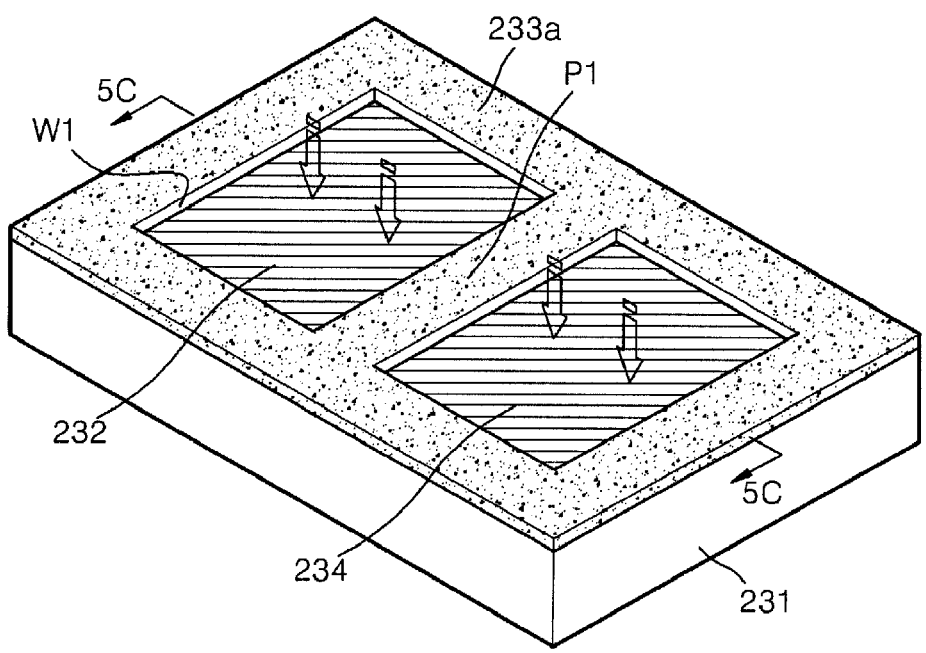

Referring to FIG. 5B, a first mask 233a having two first windows W1 is formed on the substrate 231 by performing exposure, developing, and etching processes. The width of a first portion P1 between the two windows W1 of the first mask 233a is controlled using the mask 238, and can be 50 nm to 2 µm.

Next, first and second semiconductor electrode regions 232 and 234 are formed by doping the first window W1 regions except the first mask 233a region with high concentration of a second impurity. The first and second semiconductor electrode regions 232 and 234 act as conductors since the first and second semiconductor electrode regions have very low resistances.

Figure 5C:
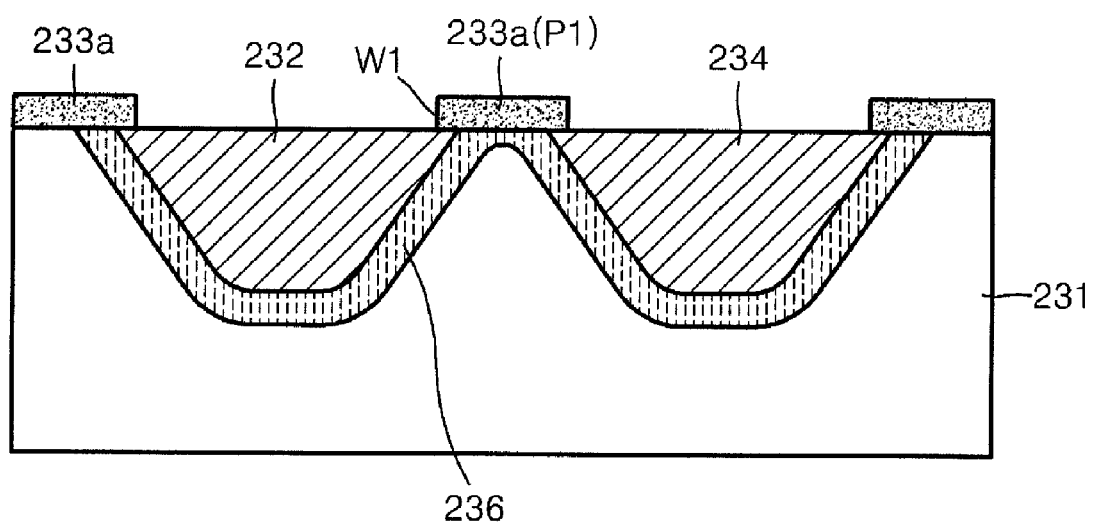

FIG. 5C is a cross-sectional view taken a line 5C-5C in FIG. 5B. Referring to FIG. 5C, when the substrate 231 is annealed, resistance regions 236 are formed by diffusing the second impurity from the first and second semiconductor electrode regions 232 and 234 doped with the high concentration of the second impurity. The resistance regions 236 are low concentration regions doped with the second impurity. At this point, the resistance regions 236 may contact under the first portion P1. The contact of the resistance region 236 can be achieved by consecutively forming the resistance regions 236 between the first and second semiconductor electrode regions 232 and 234 in a subsequent annealing process which will be described later.

Figure 5D:
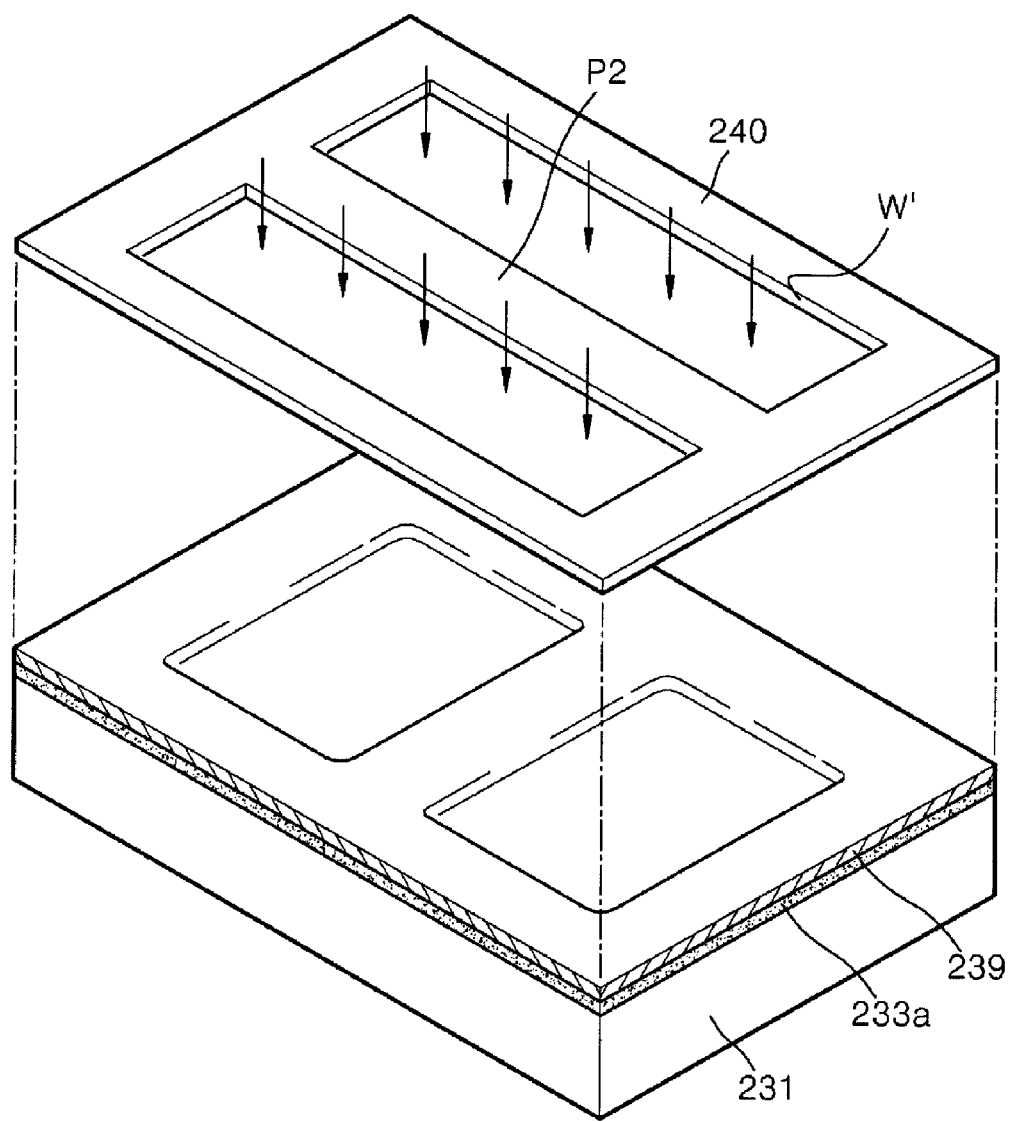

Referring to FIG. 5D, after coating a photoresist layer 239 to cover the first mask 233a on the upper surface of the substrate 231, a photomask 240 having two windows W' like the first mask 233a is placed above the photoresist layer 239. At this point, the photomask 240 is positioned so that a second portion P2 between the two windows W' perpendicularly crosses the first portion P1 of the first mask 233a to self-align the location of a resistive tip.

Figure 5E:
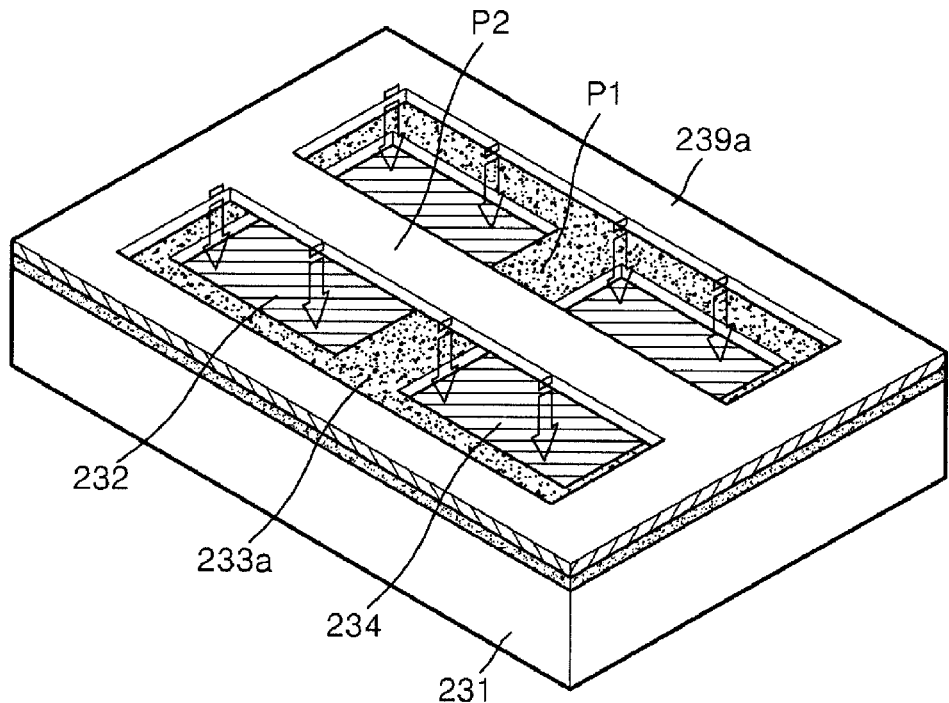

Referring to FIG. 5E, exposure, developing, and etching processes are performed on the photoresist layer 239 to form a photoresist layer 239a having the same shape as the photomask 240. The photomask 240 controls the width of the second portion P2, which can be 50 nm to 2 µm.

Figure 5F:
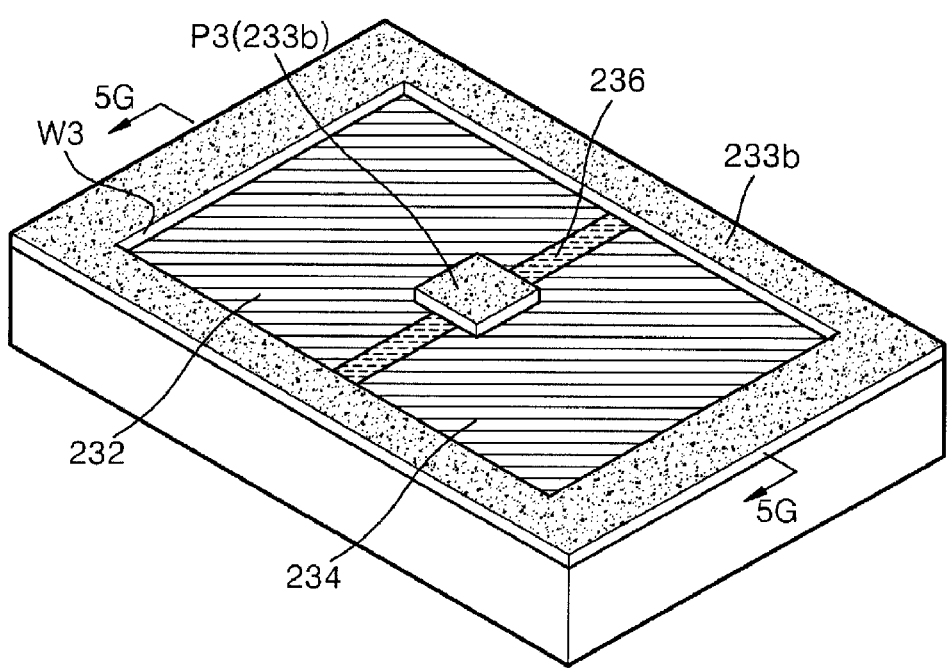

Referring to FIG. 5F, the photoresist layer 239a is removed after dry etching the first mask 233a that is not covered by the photoresist layer 239a to form a second mask 233b that includes a third window W3 and a rectangular third portion P3 located within the third window W3.

Figure 5G:
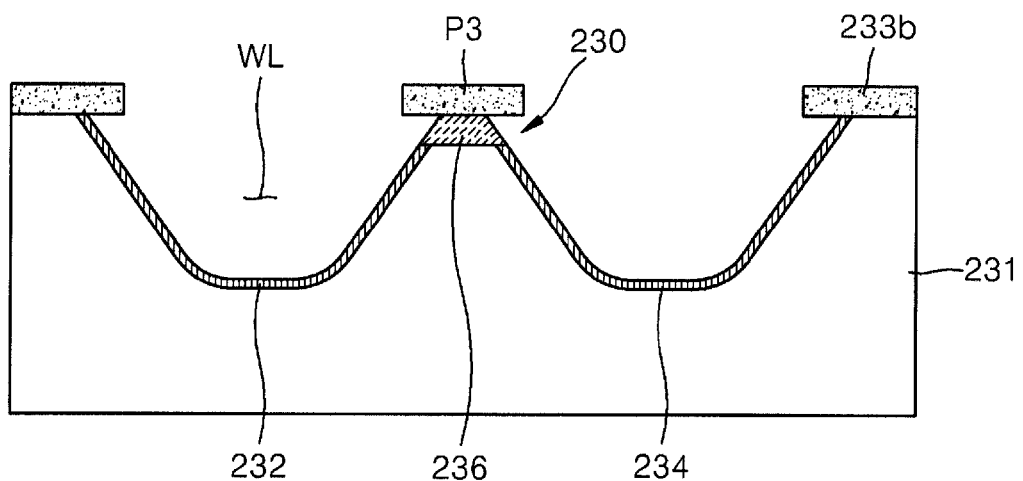

FIGS. 5G through 5K are cross-sectional views taken along a line 5G-5G of FIG. 5F. Referring to FIG. 5G, a well WL is formed by etching the third window region of the substrate 231 using the second mask 233b as a mask, and a resistive tip 230 protrudes from the well WL.

Next, an oxide film (not shown) can be formed on the surface of the substrate 231 by oxidizing the substrate 231 for a predetermined period of time under an oxygen atmosphere after removing the second mask 233b. Next, a tapered apex of the resistive tip in the resistance region can be formed by removing the oxide film.

Figure 5H:
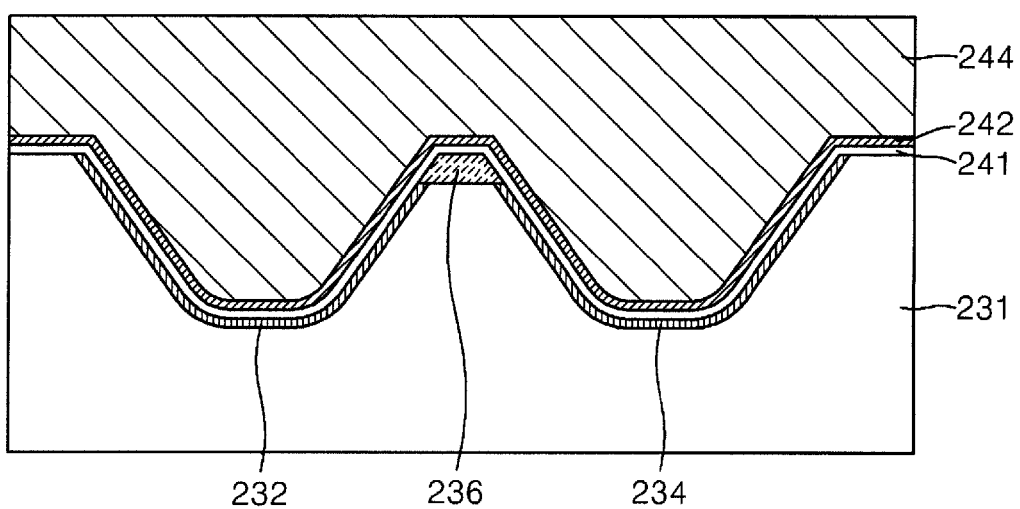

Referring to FIG. 5H, after removing the second mask 233b, a dielectric layer 241, for example a $SiO_2$ layer, is formed to a thickness of 1 to 100 nm on the substrate 231. Next, a conductive layer 242, for example a polysilicon layer, is deposited on the dielectric layer 241, and an insulating layer 244, for example, a borophospho silicate glass (BPSG) layer, is formed on the conductive layer 242. The conductive layer 242 may be formed to a thickness of 1 to 100 nm.

Figure 5I:
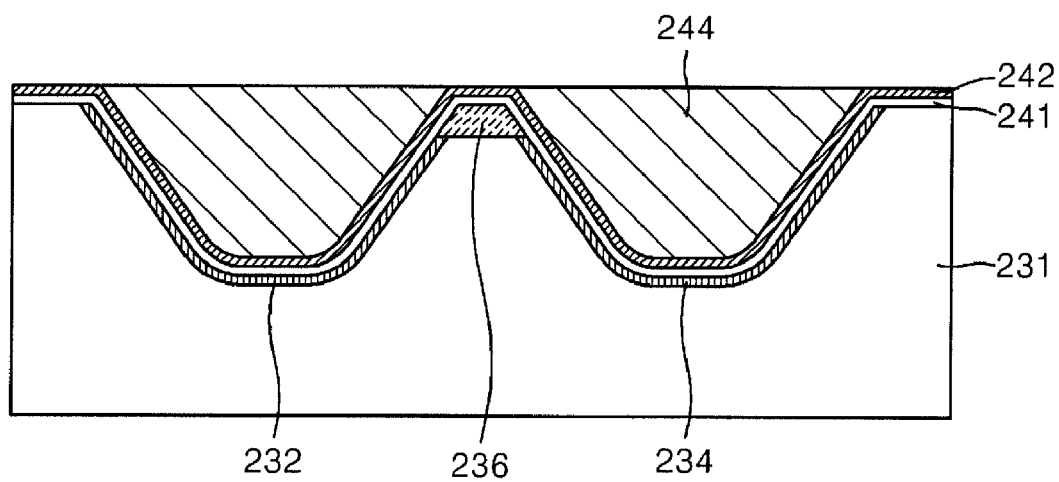

Referring to FIG. 5I, the insulating layer 244 is polished by chemical mechanical polishing (CMP) using a slurry having high etch selectivity with respect to the insulating layer 244. For example, if the insulating layer 244 is a BPSG layer and the conductive layer 242 is a polysilicon layer, a $SiO_2$ CMP slurry having an etch selectivity of greater than 20:1 with respect to the BPSG layer is used, and at this point, the polysilicon layer 242 acts as a CMP stopping layer.

Figure 5J:
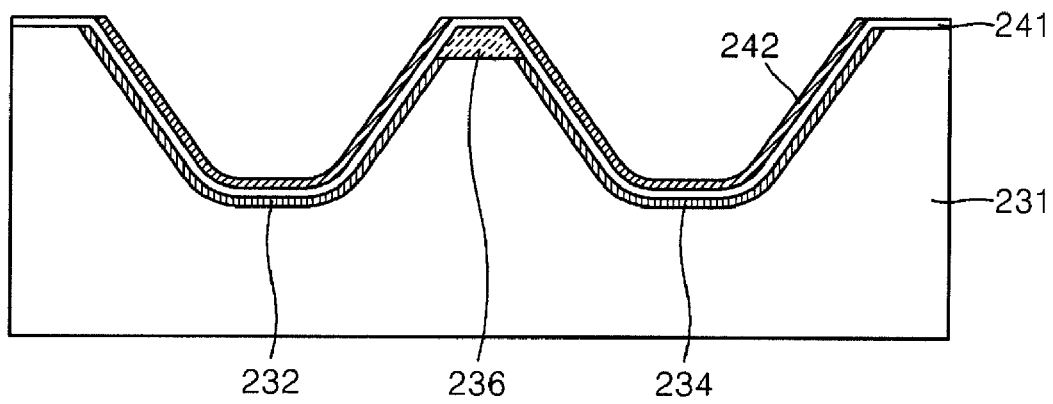

Referring to FIG. 5J, the conductive layer 242 is polished by CMP using a slurry having high etch selectivity with respect to the conductive layer 242. For example, if the conductive layer 242 is a polysilicon layer and the dielectric layer 240 is a $SiO_2$ layer, a Si CMP slurry having a high etch selectivity of greater than 20:1 with respect to the polysilicon layer is used, and at this point, the $SiO_2$ layer 244 acts as a CMP stopping layer.

Next, the insulating layer 244 is removed from the substrate 231 by etching.

Figure 5K:
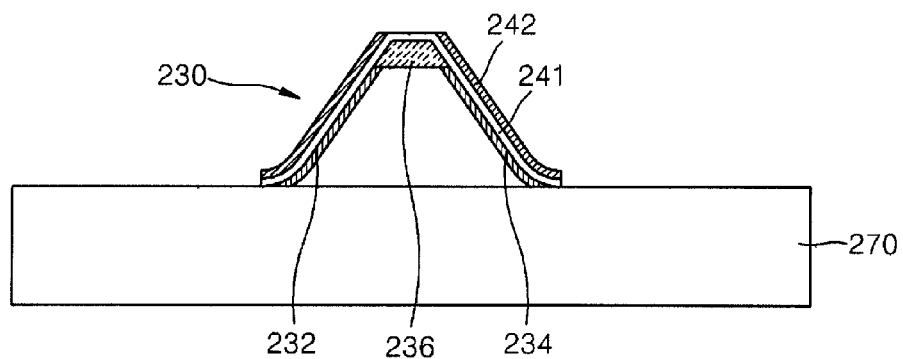

Referring to FIG. 5K, the shape of the resistive tip 230 is formed through a patterning process. The patterning process can be performed by related art photolithography, and thus the detailed description thereof will be omitted.

Through the manufacturing method described above, first and second semiconductor electrode regions 232 and 234 are formed on the slopes of the resistive tip 230, and a resistance region 238 is self-aligned at the apex of the resistive tip 230. Also, the dielectric layer 241 and an electric field shield 242_are formed on the slopes of the resistive tip 230.

Next, a cantilever 270 is formed by etching the lower surface of the substrate 231 so that the resistive tip 230 is located at the end of the cantilever 270, and the first and second semiconductor electrode regions 232 and 234 are connected to an electrode pad (not shown). Thus, the manufacture of a semiconductor probe according to an exemplary embodiment of the present invention is completed.

In the above manufacturing process, if the removal of the insulating layer 244 n FIG. 5I is omitted, the semiconductor probe of FIG. 4 can be formed.

Figure 6:
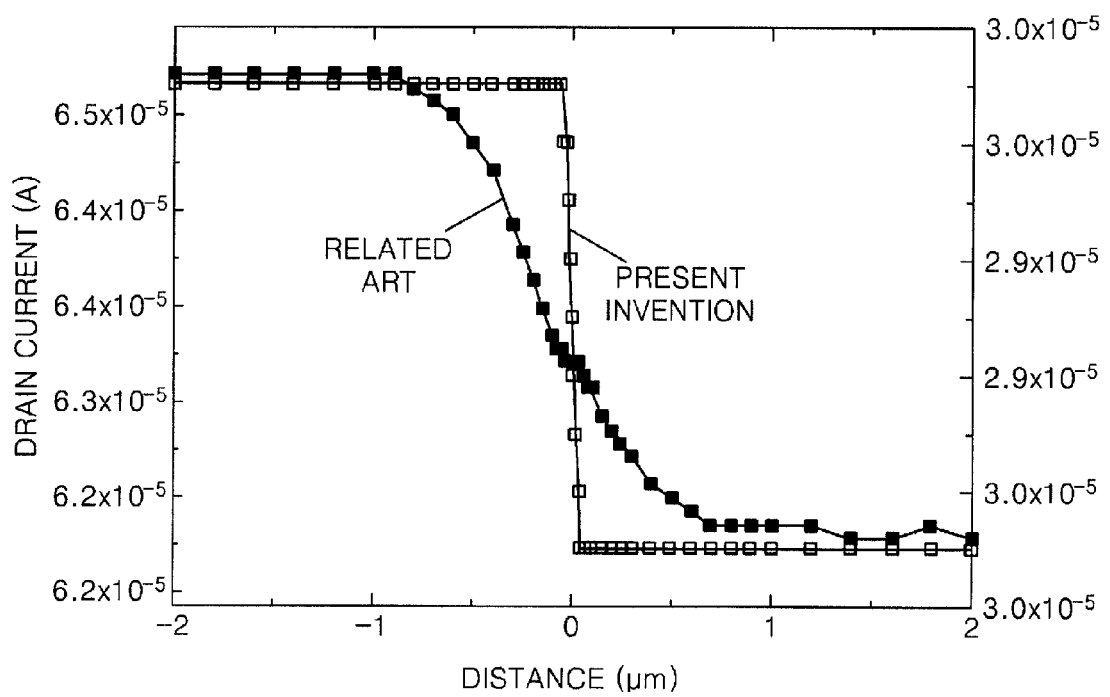
FIG. 6 is a graph illustrating a simulation result of the spatial resolution of the related art semiconductor probe of FIG. 1 and the semiconductor probe of FIG. 2, according to an exemplary embodiment of the present invention.

FIG. 6 is a graph illustrating a simulation result of the spatial resolution of a related art semiconductor probe of FIG. 1 and the semiconductor probe of FIG. 2 of the exemplary embodiment of the present invention.

For the simulation, a metal that supplies a floating voltage in a direction crossing semiconductor electrodes regions and an apex of the resistive tip is located 20 nm from the apex of the resistive tip. A floating opening having a diameter of 10 nm is formed in the metal. Floating voltages of +1V and −1V are applied to the metal.

Referring to FIG. 6, it is seen that the resistive tip of a semiconductor probe according to an exemplary embodiment of the present invention has a sharper transition width between positive charges and negative charges than the resistive tip of the related art semiconductor probe. This is because electric field shields formed on both sides of the resistance region of the resistive tip of the semiconductor probe according to the exemplary embodiment of the present invention increase the spatial resolution of the resistance region.

In a semiconductor probe having a resistive tip according to an exemplary embodiment of the present invention, electric field shields on a resistance region at the apex of the resistive tip prevent an electric field from affecting regions other than the resistance region, thereby increasing the spatial resolution.

Also, a dielectric layer formed on the resistance region and a plane formed by the electric field shields and the dielectric layer prevent wearing of the resistance region.

In a fabricating method of semiconductor probe having a resistive tip according to an exemplary embodiment of the present invention, while forming electric field shields, the resistance region is self-aligned between electrode regions.

Also, a plane consisting of a dielectric layer and a conductive layer can be correctly formed on a resistance region by using a conductive layer forming an electric field shield and a dielectric layer as etch stopper layers.

When a semiconductor probe having a resistive tip manufactured according to the method of the exemplary embodiment of the present invention is used in a high capacity ultra small information storage apparatus, the apparatus can record or read by detecting or forming charges in a small region.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A semiconductor probe, comprising:
   a resistive tip which is doped with a first impurity, and having an apex portion which is doped with a lower concentration of a second impurity of opposite polarity to the first impurity, wherein first and second semiconductor electrode regions doped with a higher concentration of the second impurity is formed on slopes of the resistive tip;
   a dielectric layer formed on the resistive tip to cover the apex portion;
   an electric field shield which is formed on the dielectric layer, and forms a plane together with the dielectric layer on the apex portion of the resistive tip; and
   a cantilever having an end on which the resistive tip is located.

2. The semiconductor probe of claim 1, wherein the plane has a diameter of 5 nm to 500 nm.

3. The semiconductor probe of claim 2, wherein the dielectric layer has a thickness of 1 nm to 100 nm at the apex portion of the resistive tip.

4. The semiconductor probe of claim 1, further comprising an insulating layer that surrounds the dielectric layer to extend an area of the plane.

5. The semiconductor probe of claim 1, wherein the dielectric layer has a thickness of 1 nm to 100 nm at the apex portion of the resistive tip.

6. The semiconductor probe of claim 1, wherein the first impurity is a p-type impurity and the second impurity is an n-type impurity.

7. The semiconductor probe of claim 1, wherein the first impurity is an n-type impurity and the second impurity is a p-type impurity.

* * * * *